Patented Nov. 9, 1948

2,453,168

UNITED STATES PATENT OFFICE 2,453,168

COPOLYMERS OF ALKENYL ARYLPHOSPHONATES WITH METHYL METHACRYLATE

Arthur Dock Fon Toy, Chicago, Ill., assignor to Victor Chemical Works, a corporation of Illinois No Drawing. Application December 29, 1945, Serial No. 638,455

19 Claims. (Cl. 154—43)

This invention relates to the formation of copolymers of at least one dialkenyl arylphosphonate with methyl methacrylate.

In my copending application, Serial No. 625,459, filed October 29, 1945, now U. S. Patent No. 2,425,459, a process is described for the production of monomeric beta, gamma unsaturated dialkenyl arylphosphonate esters. It has now been found that the product so prepared may be copolymerized with methyl methacrylate under controlled polymerizing conditions to provide a variety of copolymer compositions of commercial utility.

The new type copolymers have advantages over the polymers of the individual ester components. They form better colored and stronger resins than the polymerized beta, gamma, unsaturated dialkenyl arylphosphonates. They form fire-resisting, thermosetting infusible resins compared to the thermoplastic, non-fire resisting polymers of the methyl methacrylate.

The copolymers of this invention may be produced by mixing the liquid monomeric methyl methacrylate ester with the liquid beta, gamma unsaturated dialkenyl arylphosphonate esters in the desired proportions and adding thereto a small amount of an organic peroxide, preferably benzoyl peroxide, to act as a polymerization catalyst, and heating the mixture at a temperature and for a period of time sufficient to permit the mixture to form first, a viscous liquid, then a gel or artgum-like solid, and finally a hard, strong, infusible, glass-like solid resin.

The amount of the polymerization catalyst employed has a marked effect on the rate and degree of polymerization. Generally from 0.1 to 5.0% of benzoyl peroxide can be satisfactorily employed, but the preferred range is from about 0.5 to 3.0%. When the amount of catalyst is substantially above 5.0% it is normally too difficult to control the rate and degree of polymerization for producing the hard, glass-like type of resin product.

The temperature employed during the polymerization step may be any temperature at which the polymerization proceeds, provided it is not high enough to cause decomposition or distillation of the resin products and the starting ester components. Generally a temperature of approximately 50 to 90° C. will be satisfactory for practical purposes, though higher temperatures may be employed during the later stages of the polymerization, after the mass has set into a solid gel.

The monomeric beta, gamma unsaturated dialkenyl arylphosphonate starting ester may be prepared by the process of the Toy application, Serial No. 625,459, filed October 29, 1945.

The copolymers of the present invention when fully polymerized are hard, tough, clear, substantially colorless solids which are infusible and resistant to heat, dilute acids and alkalies. They are insoluble in organic liquids such as benzene, carbon tetrachloride, ether, acetone, alcohol, naphtha, gasoline, etc. They may be cast into various shapes by pouring the catalyzed monomeric mixed esters or partially polymerized viscous liquids into suitable molds and heating to complete the polymerization. The solid resins may be ground and polished without difficulty.

The new copolymers may be produced from mixtures of the monomeric esters or partially polymerized liquid products in substantially all proportions, but it is generally preferred to employ proportions ranging from 70% to 30% by volume of the methyl methacrylate to 30% to 70% by volume of the phosphonate ester in order to obtain the optimum physical characteristics with reference to hardness, strength, color, flame resistance, etc.

The following table illustrates a number of examples employing various proportions of the ester components, and different amounts of polymerization catalysts under different heating conditions.

| | Dialkenyl Arylphosphonate, per cent by volume | Methyl Methacrylate per cent by volume | Benzoyl Peroxide Catalyst, Grs. per 10 cc. of Monomer | Polymerization Temperature, °C. | Period of Heating, Hours | Properties of Resin Products |
|---|---|---|---|---|---|---|
| | 0 | 100 | 0.01 | 65 | 40 | Water-white, very hard, strong solid. |
| | 0 | 100 | 0.10 | 65–54 | 16 | Water-white, foamy, hard, strong solid. |
| | 30 | 70 | 0.01 | 65 | 40 | Water-white, tough solid, sl.¹ soft surface. |
| | 30 | 70 | 0.05 | 65 | 40 | Water-white, strong, very hard solid. |
| | 30 | 70 | 0.10 | 65–54 | 16 | } Sl. yellow, hard, strong solid. |
| | | | | 90 | 16 | |
| Diallyl Phenylphosphonate. | 50 | 50 | 0.05 | 65 | 40 | Water-white, sl. soft solid. |
| | 50 | 50 | 0.10 | 65–54 | 16 | } Water-white, sl. soft solid. |
| | 50 | 50 | 0.20 | 65–54 | 16 | |
| | 50 | 50 | 0.10 | 65–54 | 16 | } Sl. yellow, hard, strong solid. |
| | | | | 90 | 16 | |
| | 70 | 30 | 0.05 | 65 | 40 | Water-white, artgum-like resin. |
| | 70 | 30 | 0.20 | 65–54 | 16 | Water-white, soft, rubbery resin. |
| | 70 | 30 | 0.20 | 65–54 | 16 | } Sl. yellow, hard, strong solid. |
| | | | | 90 | 16 | |
| | 100 | 0 | 0.20 | 80 | 19 | Sl. yellow, hard, strong solid. |
| Diallyl Tolylphosphonate | 30 | 70 | 0.05 | 70 | 65 | } Sl. yellow, hard, strong solid. |
| | 30 | 70 | 0.10 | 70 | 65 | |
| Dimethallyl Phenylphosphonate. | 30 | 70 | 0.05 | 70 | 21 | |
| | 30 | 70 | 0.10 | 70 | 21 | } Water-white, hard, strong solid. |
| | 50 | 50 | 0.20 | 70 | 21 | |
| Dimethallyl Tolylphosphonate. | 30 | 70 | 0.05 | 70 | 65 | } Water-white, hard, strong solid. |
| | 50 | 50 | 0.10 | 70 | 65 | |

¹ Sl. means slightly.

The examples in the above table are given by way of illustration and are not intended to show all possible combinations and conditions which will produce satisfactory copolymers. For example, it is possible to partially polymerize either or both of the starting esters to a viscous liquid state before mixing for the copolymerizing step. By following such procedure it is possible to reduce the time required for the final step and thus facilitate the casting of resin articles. The copolymers of this invention exhibit increasing flame and fire resistance as the proportion of the phosphonate ester component increases. Those containing more than 10% by volume of the phosphonate have satisfactory flame resistance for most purposes. Those containing more than 30% have excellent flame resistance. They will burn in the presence of an applied flame but will extinguish themselves after the flame is removed.

The resins may be formed in many different shapes for commercial use, such as in the form of transparent glass-like sheets or plates, glass and textile fiber laminates, clear, resin articles, coatings, etc. Dimethallyl phenylphosphonate copolymerized with methyl methacrylate will produce excellent water-white, hard, strong resin products.

Laminated sheets of fiber glass and fabrics are prepared by impregnating the fibrous materials with liquid mixtures of beta, gamma unsaturated dialkenyl arylphosphonates and methyl methacrylate, containing from 1 to 3% benzoyl peroxide, pressing the impregnated layers together, and heating the mass in the compressed state at a temperature of 60 to 100° C. for a sufficient time to cause the impregnating liquids to polymerize, forming a strong, solid laminated sheet having a resin content of 30 to 60% by weight. The amount of resin in the laminate may be varied by varying the viscosity of the original impregnating liquids from that of the monomeric mixtures to the partially polymerized viscous liquid products.

The foregoing detailed description has been given for clearness of understanding only, and no unnecessary limitations should be understood therefrom.

What I claim as new and desire to secure by Letters Patent is:

1. A copolymer of 30 to 90% by volume of methyl methacrylate and from 70 to 10% of a member of the class consisting of diallyl and dimethallyl arylphosphonates.

2. The copolymer of claim 1 wherein the member of said class is a diallyl arylphosphonate.

3. The copolymer of claim 1 wherein the member of said class is a dimethallyl arylphosphonate.

4. The copolymer of claim 1 wherein the member of said class is diallyl phenylphosphonate.

5. The copolymer of claim 1 wherein the member of said class is diallyl tolylphosphonate.

6. The copolymer of claim 1 wherein the member of said class is dimethallyl phenylphosphonate.

7. The copolymer of claim 1 wherein the amount of methyl methacrylate is from 30 to 70%, and the amount of the arylphosphonate is from 70 to 30%.

8. The method of making a resin which comprises mixing from 30 to 90% by volume of methyl methacrylate and from 70 to 10% of a member of the class consisting of diallyl and dimethallyl arylphosphonates, and heating at a temperature between 50° C. and a temperature just below the temperature at which decomposition or distillation of the reactants and the resin products occurs, said reactants being heated in the presence of from 0.1 to 5.0% by weight of the starting esters of an organic peroxide catalyst.

9. The method of claim 8 wherein the member of said class is a diallyl arylphosphonate.

10. The method of claim 8 wherein the member of said class is a dimethallyl arylphosphonate.

11. The method of claim 8 wherein the member of said class is a diallyl phenylphosphonate.

12. The method of claim 8 wherein the member of said class is a diallyl tolylphosphonate.

13. The method of claim 8 wherein the member of said class is a dimethallyl phenylphosphonate.

14. The method of claim 8 wherein said catalyst is benzoyl peroxide.

15. The method of claim 8 wherein the temperature is between 50° and 100° C.

16. The method of claim 8 wherein the temperature is between 50° and 90° C.

17. A composition of matter comprising a laminated fibrous material impregnated with a copolymer of 30 to 90% by volume of methyl methacrylate and from 70 to 10% of a member of the class consisting of diallyl and dimethallyl arylphosphonates.

18. The composition of claim 17 wherein the fibrous material comprises fiber glass.

19. The composition of claim 17 wherein the fibrous material comprises textile fibers.

ARTHUR DOCK FON TOY.

REFERENCES CITED

The following references are of record in the file of this patent:

UNITED STATES PATENTS

| Number | Name | Date |
|---|---|---|
| 2,389,576 | Kosolapoff | Nov. 20, 1945 |